United States Patent

Van Dijk et al.

(10) Patent No.: US 6,630,183 B1
(45) Date of Patent: Oct. 7, 2003

(54) METHOD FOR PREPARING EDIBLE, CRUNCHY MATERIAL AND PRODUCT COMPRISING SUCH MATERIAL

(75) Inventors: Lambertus Martinus Servatius Van Dijk, Keldonk (NL); Godelieve Johanna Maria Bun, Culemborg (NL); Christianus Franciscus Maria Heesakkers, Empel (NL); Nathalie Lydia Matysiak, Hertgenbosch (NL)

(73) Assignee: Mars B.V., Veghel (NL)

(*) Notice: Subject to any disclaimer, the term of this patent is extended or adjusted under 35 U.S.C. 154(b) by 0 days.

(21) Appl. No.: 09/446,412

(22) PCT Filed: Jun. 23, 1998

(86) PCT No.: PCT/EP98/04023

§ 371 (c)(1),
(2), (4) Date: Apr. 5, 2000

(87) PCT Pub. No.: WO98/58548

PCT Pub. Date: Dec. 30, 1998

(30) Foreign Application Priority Data

Jun. 23, 1996 (NL) .................................. 97201918

(51) Int. Cl.$^7$ ................... A23G 3/00; A23G 3/02; A23G 3/20
(52) U.S. Cl. ................ 426/94; 426/101; 426/103; 426/283; 426/514; 426/552; 426/660
(58) Field of Search ................ 426/660, 632, 426/302, 303, 306, 552, 94, 95, 101, 103, 138, 283, 278, 280, 514; 99/351, 353, 377, 378

(56) References Cited

U.S. PATENT DOCUMENTS

| | | | |
|---|---|---|---|
| 3,868,471 A | * | 2/1975 | Decelles et al. ............ 426/303 |
| 4,205,091 A | * | 5/1980 | Van Horne ................. 426/138 |
| 4,303,690 A | | 12/1981 | Haas, Sr. et al. |
| 4,386,108 A | | 5/1983 | Richter |
| 4,442,132 A | | 4/1984 | Kim |
| 4,575,461 A | | 3/1986 | Friedman et al. |
| 4,752,484 A | * | 6/1988 | Pflaumer et al. ............. 426/94 |
| 4,812,323 A | * | 3/1989 | Savage .................. 426/496 |
| 4,822,627 A | | 4/1989 | Clegg et al. |
| 4,927,655 A | * | 5/1990 | Ito ........................ 426/549 |
| 4,927,656 A | * | 5/1990 | Ito ........................ 426/549 |
| 5,191,830 A | | 3/1993 | Jacobson |
| 5,223,286 A | * | 6/1993 | Selbak .................... 426/94 |
| 5,238,692 A | * | 8/1993 | Taga et al. ................ 426/274 |
| 5,298,273 A | * | 3/1994 | Ito ........................ 426/549 |
| 5,304,386 A | | 4/1994 | Dugas et al. |
| 5,492,710 A | | 2/1996 | Seyam |
| 5,533,439 A | | 7/1996 | Ito |
| 5,612,074 A | * | 3/1997 | Leach ..................... 426/74 |
| 5,964,144 A | * | 10/1999 | Chapa .................... 99/351 |

FOREIGN PATENT DOCUMENTS

| | | |
|---|---|---|
| GB | 2 168 233 | 6/1986 |
| WO | 92 10938 | 7/1992 |

OTHER PUBLICATIONS

Jan Morgan, Chocolate and Candy Cookbook, Arco Publishing, 1979, 152–155.*

Database WPI, Week 8525, Derwent Publications Ltd., London, GB; An 85–150276.

XP002083311 & JP 60 0832526 A (O. Shokuhin), May 11, 1985.

* cited by examiner

*Primary Examiner*—Nina Bhat
(74) *Attorney, Agent, or Firm*—Fitzpatrick, Cella, Harper & Scinto

(57) ABSTRACT

A method for preparing an edible, crunchy material comprising a batter containing a small amount of protein, 8–45% moisture, 35–60% sugar and 12–63% of a nut material and wherein the batter is heated at a temperature of 100–180° C. for period of 30–42 seconds which serves as an envelope for another food material.

18 Claims, 1 Drawing Sheet

METHOD FOR PREPARING EDIBLE, CRUNCHY MATERIAL AND PRODUCT COMPRISING SUCH MATERIAL

This application claims benefit under 35 U.S.C. 371 of PCT/EP98/04023, filed Jun. 23, 1998.

The invention relates to a method for preparing an edible, crunchy material. Such material may be marketed in such a form that it is easy to eat and/or that it has an attractive appearance. It is also possible to use a material of this kind as part of an edible product, whereby the hardness and consistency of the material may be used to give the edible product a particular form and/or to envelope the edible product.

Especially when the crunchy material is used to give an edible product, which may partially consists of another material, for example a soft material, a selected shape or to envelop said other material, a relatively large part of the edible product will consist of said crunchy material. Partially in connection therewith there is a need for crunchy material having a special and/or recognizable taste, which either harmonizes well with the taste of said other parts of the edible product or which adds a special element to said edible product. Such a crunchy material must have an attractive appearance, a special taste and a pleasant texture. The texture determines the mouth feel of the product.

The object of the invention is to provide a method for preparing an edible, crunchy material having a distinctly recognizable and special taste and texture, which may be used to form a delicacy, either separately or in combination with other materials, which crunchy material can be given various forms, in particular the form of a plate, more in particular a three-dimensionally curved plate, and which material may in particular form an edible product, which envelopes another edible material.

In order to accomplish that objective the crunchy material is according to the invention prepared by heating a batter, which, apart from moisture, contains at least 25% sugar and at least 8% nut material, at a temperature of at least 100° C. for more than 30 seconds. The term 'nut material' means pieces or particles of nuts, such as hazelnut, almond or coconut. The term coconut that is used in this connection is understood to refer to the dry, white meat of the coconut. These nuts are presented as examples in this specification. Also other nuts can be used.

The batter is made by mixing sugar, water and pieces of the nut material, which pieces of nut material are preferably dried and/or toasted and/or roasted, and whereby it is preferred to add a small amount of egg solution. The dimensions of the pieces are 0.5 mm or greater, preferably smaller than about 2 mm, more preferably smaller than about 1.5 mm.

The crunchy material thus prepared appears to have a very pleasant, special and recognizable taste and texture and is very suitably for forming a delicacy in combination with other edible materials. Due to its relatively hard and consistent nature it can readily serve as an envelope for other edible materials, in particular softer materials, and it is capable of forming the delicacy of which it forms part into a selected shape.

Preferably the batter contains 8–45% moisture and, apart from said moisture, 35–60% sugar and 12–63% nut material, and the batter is heated at a temperature of 100–180° C. for a period of 30–420 seconds.

Satisfactory results have been obtained with a batter which is preferred to the aforesaid batter, and which contains 8–25% moisture, preferably 12–18% moisture, and, apart from said moisture, 30–50% sugar and 40–60% nut material, and which is heated at a temperature of 120–160° C., preferably at a temperature of 135–150° C., for a period of 100–350 seconds, preferably 120–200 seconds.

Furthermore it is possible to add other substances, whereby, apart from moisture, maximally 40% coconut milk powder and/or maximally 35% starch and/or maximally 2egg product and/or maximally 0.7% baking powder is added to the batter. Preferably the amount of coconut milk powder being added ranges from 10% to 40% and the amount of egg product being added ranges from 0.5% to 1.5% (dry weight).

In the above-described manner an edible material having a tasty, crunchy texture and having a blended taste of caramelized sugar and toasted/roasted nuts may be obtained. This material may very well be used as an individual edible product, but it may also be used as part of an edible product, especially as an envelope of a softer part of said edible product.

The heating of the batter in order to obtain the crunchy material, which heating process may also be indicated by the term baking, is preferably carried out at substantially atmospheric pressure, preferably at less than 0.1 bar overpressure, which appears to produce significantly better results than when the batter is baked at a higher pressure, which is generated when steam is formed during the baking process, which steam cannot escape to an unlimited degree. This latter way of baking is a conventional baking process for producing waffles.

The batter may either have a low viscosity or a higher viscosity, whereby the batter cannot be poured but must be introduced into a baking tin as a dollop. The batter is preferably formed into the shape of a plate or a layer and heated in that shape, so that the edible, crunchy material is plate-shaped. Preferably it is three-dimensionally curved thereby, so that the plate comprises a space, at least partially so. Such a space, which is enveloped by the crunchy material, may be filled with another edible material, which may be softer, thus forming an edible product comprising both materials.

The shells of crunchy material, into which the soft material may be introduced, are preferably made by forming a plate of crunchy material, which comprises several partially formed spaces, whereby parts of the plate which each comprise one or more spaces are separated from each other. In itself this is a usual way of producing shell-shaped waffles.

Preferably the batter is heated between two heated surfaces of a baking device, whereby said two surfaces have a mutually corresponding shape, so that the material is heated in the shape of a three-dimensionally curved plate between said two surfaces. This method, which is a usual method for producing waffles, may be used for producing the crunchy material according to the invention, albeit that the baking process is preferably carried out at substantially atmospheric pressure. It is possible to heat either one of the surfaces or both surfaces, and said surfaces are preferably provided with a coating which prevents the material from sticking to the surface.

The invention furthermore relates to an edible crunchy material which contains at least 25% sugar and at least 8% nut material. Such material may form a delicacy by itself, possibly in combination with another material. Such a delicacy may for example consist of alternating layers of the crunchy material and another material, such as chocolate. Preferably the crunchy material contains 35–65% sugar and 12–70% nut material. In a preferred embodiment the crunchy material contains 30–50% sugar and 40–70% nut material.

Furthermore the material may contain other substances, such as maximally 40% coconut milk powder and/or maximally 35% starch and/or maximally 2% egg product and/or maximally 0.7% baking powder. Preferably the amount of coconut milk powder ranges from 10% to 40%, and the amount of egg product ranges from 0.5 to 1.5%. The coconut milk is preferably used in combination with coconut as nut material.

The invention furthermore relates to an edible product at least partially provided with an envelope consisting of the aforesaid crunchy material, within which another edible material is present, which may be softer, which material preferably contains nut material. It is preferred to provide the edible product with a layer of chocolate on the outside, on which small pieces of nut material may be provided, which are preferably toasted/roasted or dried. Preferably the material present within said crunchy material, which may be softer, may be enveloped by a layer of chocolate, which preferably contains small pieces of nut material, which are preferably dried or toasted/roasted, at the location where it is not enveloped by the crunchy material. Research has shown that such an edible product is a very attractive and tasty product, which has a very pleasant texture.

The nut materials of the different parts of the edible product are preferably of the same kind of nut, i.e. coconut, almond, hazelnut, or an other nut.

Table A lists seven recipes, whereby the batter made according to those recipes resulted in a quite edible, crunchy material containing coconut after being heated in a conventional baking device for waffles for 160 seconds, and that at atmospheric pressure. The baking temperature for recipes 1, 2, 4, 5, 6 and 7 was 140° C., for recipe 3 the temperature was 160° C.

Tables B and C show recipes for a batter containing almond and a batter containing hazelnut respectively. The baking temperature for both these recipes was 140° C. and the baking time was 120 seconds.

Brief description of the raw materials used in the recipes:

Egg Albumen is obtained from whites of chickens' eggs after removal of reducing sugar.

Granulated Sugar is crystallized and refined milled sugar containing principally sucrose, obtained from either beet or cane. Particle size between 0.4 and 0.8 mm.

Castor Sugar is crystallized and refined milled sugar containing principally sucrose, obtained from either beet or cane. Particle size between 600 and 100 micron.

Icing Sugar is crystallized and refined milled sugar containing principally sucrose, obtained from either beet or cane. Particle size lower than 100 micron.

Sugar 70% is a solution of castor/granulated sugar in water with a solids content of 70%.

Glucose 46 DE is an aqueous solution of dextrose, maltose and higher saccharides obtained from maize or wheat starch. Dextrose Equivalent value is 46.

Desiccated Coconut is obtained from the dried white meat from the coconut fruit. Size of fines is smaller then 1 mm.

Coconut Milk Powder is obtained by drying of the water/fat emulsion that is pressed from the white meat of the coconut fruit.

Hazelnut/Hazelnut pieces are roasted and chopped to the appropriated size i.e.
fines: particles smaller than 1.5 mm
chopped: particles between 1.5 and 3.5 mm.

Almond/Almond pieces are roasted and chopped to the appropriated size i.e.
fines: particles smaller than 1.5 mm
sliced and chopped: particles between 1.5 and 3.5 mm. wide and thickness lower than 1 mm.

Wheat Flour is obtained by extracting the endosperm of wheat kernels.

Salt is sodium chloride. It is a white crystalline powder, odourless and homogeneous with a salty taste.

Sodium Bicarbonate is an odourless white crystalline powder.

Lecithin is the product obtained from crude soja bean oil by process of filtration, hydratation, separation and drying. It contains all natural phosphatides present originally in the crude soja bean oil and soja bean oil.

BRIEF DESCRIPTION OF THE DRAWINGS

The invention will be explained in more detail hereafter with reference to the accompanying Figures, which are merely diagrammatic representations. The described example is a delicacy having a shell of crunchy material comprising coconut, the shell enveloping soft material.

FIG. 1 is a plan view of the three-dimensionally curved plate of edible, crunchy material 1, which contains 30% sugar and 68% coconut, the rest being protein, and which has been heated in a conventional baking device for baking waffles under atmospheric pressure. Contrary to the situation where known waffles are baked, the build-up of a pressure is prevented thereby, because the steam being generated can freely escape.

The six shell-shaped parts 2 may be separated, for example by means of a mechanical operation which is known per se, after which said parts 2 may be used as an envelope for a delicacy.

Figure 1:
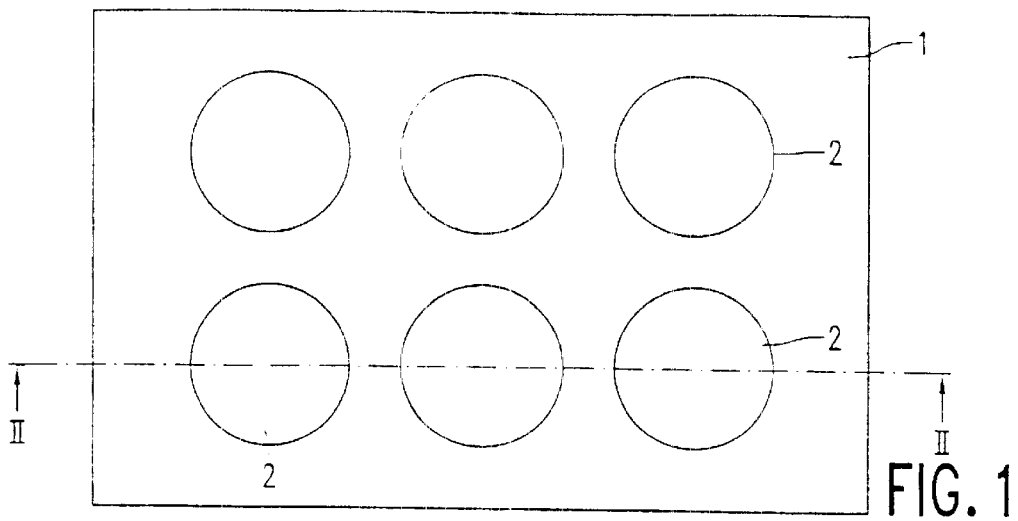
FIG. 1 is a plan view of a three-dimensionally curved piece of plate-shaped, edible, crunchy material.
Figure 2:
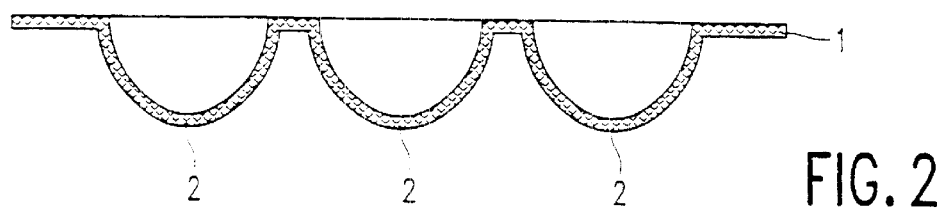
FIG. 2 is a sectional view along line II—II in FIG. 1.
Figure 3:
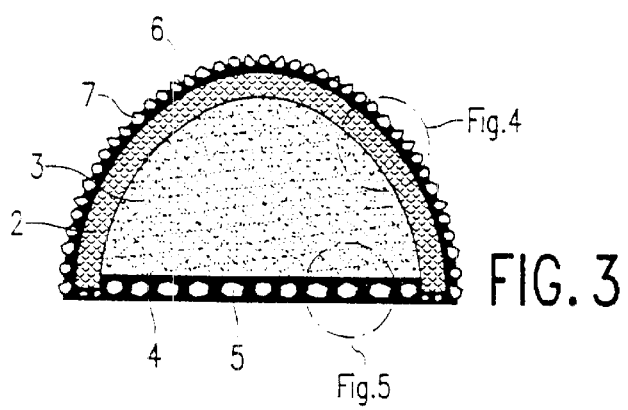
FIG. 3 is a cross-sectional view of a delicacy.

FIG. 3 is a cross-sectional view of such a delicacy, which comprises an envelope 2 ("shell") of a crunchy material containing 30% sugar and 68% coconut, the rest being protein. Shell 2 is filled with whipped coconut cream 3, which is covered with a layer of milk chocolate 4 containing small pieces of coconut 5, which may or may not be toasted or dried. Also shell 2 is covered with a layer of milk chocolate 6, which likewise contains small pieces of coconut 7, which may or may not be toasted or dried. Layer of chocolate 4, 6 envelopes the delicacy entirely.

Figure 4:
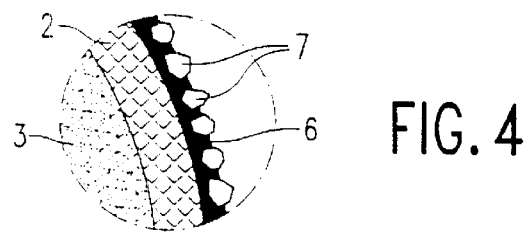
FIGS. 4 and 5 are more detailed views of parts of FIG. 3.
Figure 5:
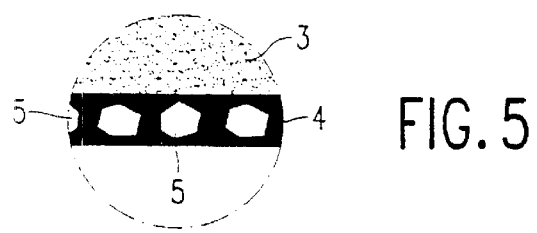

FIGS. 4 and 5 show parts of FIG. 3 in more detail. The delicacy according to FIGS. 3–5 is merely an example of the great number of variations which are possible within the scope of the invention. These variations relate to the shape, the size as well as to the material of the product.

TABLE A

| | Recipe 1 | | Recipe 2 | | Recipe 3 | | Recipe 4 | | Recipe 5 | | Recipe 6 | | Recipe 7 (preferred) | |
|---|---|---|---|---|---|---|---|---|---|---|---|---|---|---|
| | [% wet] | [% dry] | [% wet] | [% dry] | [% wet] | [% dry] | [% wet] | [% dry] | [% wet] | [% dry] | [% wet] | [% dry] | [% wet] | [% dry] |
| Egg Albumen | 0.9 | 1.1 | 0.5 | 0.8 | | | | | 1.4 | 2.0 | 1.1 | 1.3 | 1.2 | 1.4 |
| Castor Sugar | | | 10.2 | 12.0 | | | | | | | 5.0 | 6.0 | | |
| Des. Coconut | 41.8 | 49.0 | 51.0 | 58.8 | 10.4 | 16.5 | 45.5 | 49.3 | 29.5 | 41.8 | 37.6 | 44.2 | 25.0 | 28.5 |
| Glucose 46 DE | | | 10.2 | 9.9 | | | | | | | | | | |
| Coconut milkpowder | | | | | | | | | 9.5 | 13.5 | | | 34.2 | 39.4 |
| Sugar 70% | 30.3 | 25.6 | 15.3 | 12.7 | 20.9 | 32.9 | | | 21.4 | 21.9 | 30.9 | 26.2 | 18.7 | 15.5 |
| Icing Sugar | 20.2 | 24.3 | 5.1 | 6.0 | 5.2 | 8.2 | 45.5 | 50.7 | 14.3 | 20.8 | 18.2 | 22.1 | 12.5 | 14.8 |
| Salt | | | | | 0.3 | 0.4 | | | | | | | | |
| Sod. bicarbonate | | | | | 0.4 | 0.7 | | | | | | | | |
| Lecithin | | | | | 0.1 | 0.2 | | | | | | | | |
| Wheat Flour | | | | | 26.1 | 41.1 | | | | | | | | |
| Water | 6.7 | 0.0 | 7.7 | 0.0 | 36.6 | 0.0 | 9.0 | 0.0 | 23.8 | 0.0 | 7.2 | 0.0 | 8.3 | 0.0 |
| Moisture Content % | 17.1 | | 15.6 | | 40.4 | | 40.4 | | 31.4 | | 17.7 | | 15.5 | |
| Total Sugar % | | 50.0 | | 40.7 | | 41.2 | | 50.7 | | 42.7 | | 54.3 | | 30.3 |

TABLE B

| | (% wet) | (% dry) |
|---|---|---|
| Egg Albumen | 1.6 | 1.7 |
| Castor Sugar | 31.9 | 36.2 |
| Almond fines | 16.0 | 17.7 |
| Almond chopped | 39.9 | 44.4 |
| Water | 10.6 | 0.0 |
| Moisture Content % | 11.9 | |
| Total Sugar % | | 36.2 |

TABLE C

| | (% wet) | (% dry) |
|---|---|---|
| Egg Albumen | 1.6 | 1.7 |
| Castor Sugar | 31.9 | 36.2 |
| Hazelnut fines | 16.0 | 17.7 |
| Hazelnut chopped | 39.9 | 44.4 |
| Water | 10.6 | 0.0 |
| Moisture Content % | 11.6 | |
| Total Sugar % | | 36.2 |

What is claimed is:

1. A method for preparing an edible product having an envelope and a filling, wherein the envelope is formed by a three-dimensionally curved layer or plate of edible crunchy material, and wherein a batter comprising:

between 30%–50% dry weight sugar, between 40%–70% dry weight nut material, and moisture, is heated between two curved surfaces of a baking device at a temperature between 100° C. and 180° C. for a period of 30–420 seconds to form the envelope, and wherein the envelope is filled with a material that is softer than the material of the envelope.

2. The method according to claim 1, wherein the nut material is comprised of pieces having a dimension of more than 0.5 mm, wherein the pieces are dried, toasted, roasted, or combinations thereof.

3. The method according to claim 2, wherein the pieces are less than about 2 mm.

4. The method according to claim 3, wherein the pieces are less than 1.5 mm.

5. The method according to claim 1, wherein the moisture in the batter is 8%–45% by weight, and is heated at a temperature of 120° C.–160° C. for a period of 100–350 seconds.

6. The method according to claim 5, wherein the moisture in the batter is 8%–25% by weight.

7. The method according to claim 1, wherein at most 40% dry weight coconut milk powder is added to the batter.

8. The method according to claim 1, wherein 10%–40% dry weight coconut milk powder is added to the batter.

9. The method according to claim 1, wherein at most 2% dry weight egg product is added to the batter.

10. The method according to claim 1, wherein about 0.5%–1.5% dry weight egg product is added to the batter.

11. The method according to claim 1, wherein at most 40% dry weight coconut milk powder and at most 2% dry weight egg product is added to the batter.

12. The method according to claim 1, wherein 10%–40% dry weight coconut milk powder and about 0.5–1.5% dry weight egg product is added to the batter.

13. The method according to claim 1, wherein the heating takes place at atmospheric pressure.

14. The method according to claim 1, wherein the heating takes place at less than 0.1 bar overpressure.

15. The method according to claim 1, wherein the layer comprises more than one partially formed spaces, and wherein the partially formed spaces are separated from each other after heating.

16. The method according to claim 1, wherein the nut material is coconut.

17. The method according to claim 1, wherein the nut material is almond.

18. The method according to claim 1, wherein the nut material is hazelnut.

* * * * *